US008509171B2

(12) United States Patent
Moulsley et al.

(10) Patent No.: US 8,509,171 B2
(45) Date of Patent: Aug. 13, 2013

(54) RESOURCE ALLOCATION IN TWO DOMAINS

(75) Inventors: Timothy J. Moulsley, Caterham (GB); Matthew P. J. Baker, Canterbury Kent (GB); Milos Tesanovic, Cambridge (GB)

(73) Assignee: Koninklijke Philips N.V., Eindhoven (NL)

( * ) Notice: Subject to any disclaimer, the term of this patent is extended or adjusted under 35 U.S.C. 154(b) by 245 days.

(21) Appl. No.: 12/989,657

(22) PCT Filed: Apr. 21, 2009

(86) PCT No.: PCT/IB2009/051637
§ 371 (c)(1),
(2), (4) Date: Oct. 26, 2010

(87) PCT Pub. No.: WO2009/133490
PCT Pub. Date: Nov. 5, 2009

(65) Prior Publication Data
US 2011/0044277 A1   Feb. 24, 2011

(30) Foreign Application Priority Data
Apr. 30, 2008   (EP) ..................................... 08305141

(51) Int. Cl.
*H04W 4/00*   (2009.01)
(52) U.S. Cl.
USPC .......................................................... 370/329
(58) Field of Classification Search
USPC .................. 370/329, 330, 431, 321, 341, 342, 370/436, 465, 478, 310
See application file for complete search history.

(56) References Cited

U.S. PATENT DOCUMENTS

| 5,499,246 | A | * | 3/1996 | Cooper | 370/345 |
| 5,995,501 | A | * | 11/1999 | Jung et al. | 370/350 |
| 7,146,312 | B1 | * | 12/2006 | Demetrescu et al. | 704/229 |
| 2007/0002823 | A1 | * | 1/2007 | Andersen et al. | 370/349 |
| 2008/0049690 | A1 | * | 2/2008 | Kuchibhotla et al. | 370/338 |

FOREIGN PATENT DOCUMENTS
CN   1089412 A   7/1994

OTHER PUBLICATIONS

Fujitsu: "On UL Scheduling Grant"; 3GPP TSG RAN WG1 #50,R1-073597, Athens, Greece, Aug. 20-24, 2007, 3 Page Document.
Philips: "PDCCH Message Information Content for UL Resource Allocation"; 3GPP TSG RAN WG1 #52, R1-080823, Sorrento, Italy, Feb. 11-15, 2008, 3 Page Document.
Ericsson: "HARQ Operation in Case ORF UL Power Limitation"; 3GPP TSG RAN WG2 #60, R2-074940, Jeju Island, Korea, Nov. 5-9, 2007, 5 Page Document.
Ericcson: "UL Resource Assignment Strategies"; 3GPP TSG RAN WG2 #54, R2-062349, Tallinn, Estonia, Aug. 28-Sep. 1, 2006, 4 Page Document.

* cited by examiner

*Primary Examiner* — Kwang Yao
*Assistant Examiner* — Anh Ngoc Nguyen

(57) ABSTRACT

A method for transmitting data from a secondary station to at least one primary station includes the primary station transmitting on a signaling channel to the secondary station a resource allocation message allocating resource blocks for transmission of data from the secondary station. The resource allocation message includes a field for allocating resources in a first domain, where at least one bit of the field is stolen to allocate resources in a second domain which is different from the first domain.

10 Claims, 3 Drawing Sheets

RESOURCE ALLOCATION IN TWO DOMAINS

FIELD OF THE INVENTION

The present invention relates to a method for communicating data through a network. More specifically, this invention relates to a method for communicating in a mobile telecommunication network, for example, a UMTS network.

BACKGROUND OF THE INVENTION

Many communication systems operate using a centralised scheduler which is responsible for allocating transmission resources to different nodes so that they are able to communicate with one another.

A typical example is the uplink of the UMTS LTE (Long Term Evolution), where the uplink and transmissions from different secondary stations, also named User Equipments (UEs), are scheduled in time and frequency by the primary station of the cell, also named the evolved Node B (eNB). The primary station transmits a "scheduling grant" message to a secondary station, indicating a particular time-frequency resource for the secondary station's uplink transmission, typically around 3 ms after the transmission of the grant message. The grant message also typically specifies other transmission parameters, e.g. the data rate or power to be used for the secondary station's transmission.

If the secondary station is at the limit of communication range, for instance at the cell edge, the uplink transmission rate is typically limited by the available transmit power of the secondary station. In such a case, it may be desirable to be able to transmit a data packet using a small amount of resource in the frequency domain and an extended resource in the time domain.

This kind of approach is already proposed for instance in 3GPP for LTE, and is known as "TTI bundling", where TTI is a Transmission Time Interval. Here, the secondary station transmits a packet using a small amount of resource in the frequency domain (e.g. 1 Resource Block), but extending over more than one subframe. The number of subframes in a TTI bundle is currently assumed to be configured semi-statically—i.e. by higher-layer signalling, which may be updated occasionally but not for every packet transmission. In general, the higher layer signalling is slower than normal signalling. TTI bundling is more efficient than sending multiple transmissions over successive subframes, since only one downlink control message is required, and only one ACK/NACK needs to be sent for the whole bundle. The Use of TTI bundling (and the bundle size) is configured semi-statically for instance by higher layer signalling. The TTI bundling approach is intended to be applied in the case of VoIP where very small resource allocations in the frequency domain are appropriate (e.g. 1 RB), and the data packet size does not vary.

However, the problem addressed here is that currently available signalling channels are not efficient for the envisaged application or effective in changing the degree of bundling dynamically which would be desirable to match changing packet sizes and/or changes in the radio channel.

SUMMARY OF THE INVENTION

It is an object of the invention to propose a method for allocating resources with a bundling approach being more dynamic.

It is another object of the invention to propose a method for allocating resources linked in a bundle requiring reduced signalling.

To this end, in accordance with a first aspect of the invention, a method is proposed for transmitting data from a secondary station to at least one primary station, comprising, at the primary station, transmitting on a signaling channel to the secondary station a resource allocation message allocating resource blocks for transmission of data from the secondary station, said message comprising a field for allocating resources in a first domain, and wherein at least one bit of said field is stolen to allocate resources in a second domain being different from the first domain.

As a consequence, the size of the bundle or the number of resources in time can be adjusted to the need of each secondary station, depending on their available data rate. Moreover, the solution proposed does not cause more signalling, since the control message related to allocation of resource blocks may be of the same size as the normal control message. In a variant of the first aspect of the invention, the resource blocks are transmitted in a bundle.

In accordance with a second aspect of the invention, a primary station is proposed comprising transmitting means for transmitting data to a secondary station, the transmitting means being arranged to transmit on a signaling channel to the secondary station a resource allocation message allocating resource blocks for transmission of data from the secondary station, said message comprising a field for allocating resources in a first domain, and wherein at least one bit of said field is stolen to allocate resources in a second domain being different from the first domain.

In accordance with another aspect of the invention, a method is proposed for transmitting data from a secondary station to at least one primary station, comprising, at the primary station, transmitting on a signaling channel to the secondary station a resource allocation message allocating resource blocks for a bundling transmission of data from the secondary station, the number of resource blocks being dependent of the size of a packet to be transmitted.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
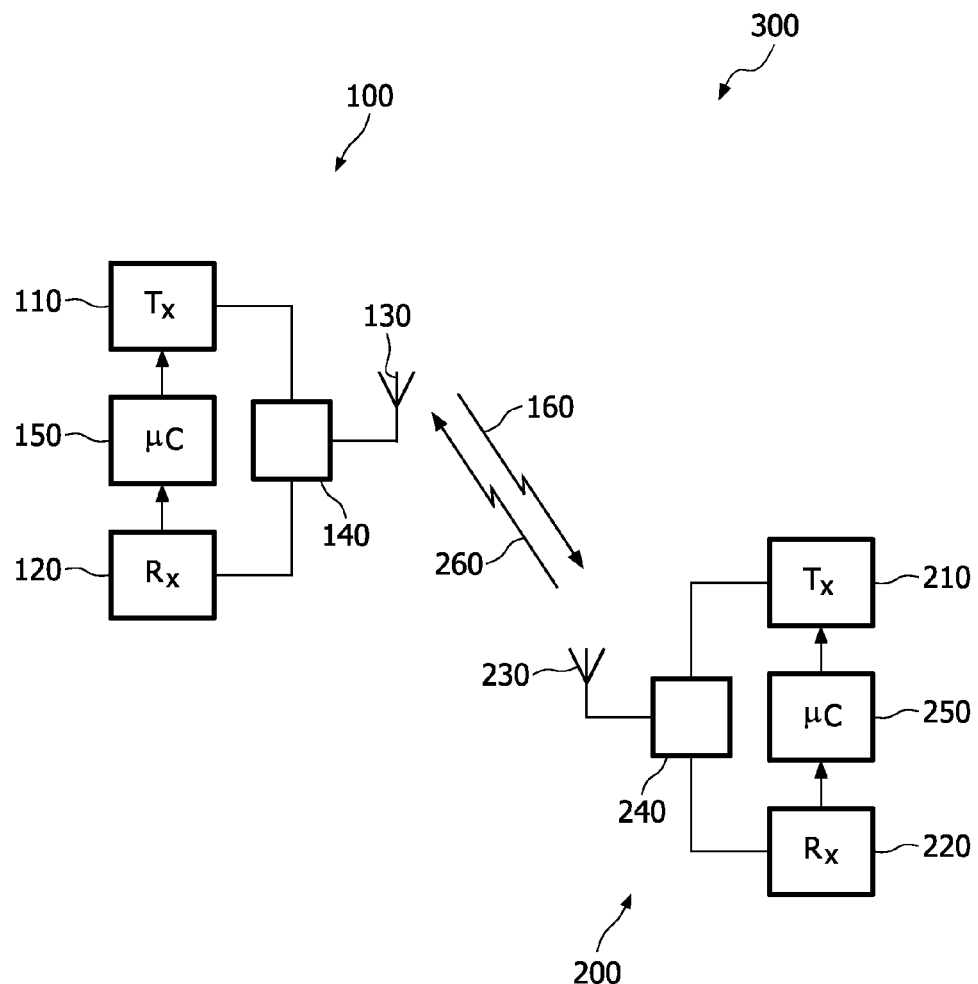
FIG. 1 is a block diagram of a system of communication in which the first aspect of the invention is implemented.

The present invention relates to a system of communication 300 as depicted on FIG. 1, comprising a primary station 100, like a base station, and at least one secondary station 200 like a mobile station.

The radio system 300 may comprise a plurality of the primary stations 100 and/or a plurality of secondary stations 200. The primary station 100 comprises a transmitter means 110 and a receiving means 120. An output of the transmitter means 110 and an input of the receiving means 120 are coupled to an antenna 130 by a coupling means 140, which may be for example a circulator or a changeover switch. Coupled to the transmitter means 110 and receiving means 120 is a control means 150, which may be for example a processor. The secondary station 200 comprises a transmitter means 210 and a receiving means 220. An output of the transmitter means 210 and an input of the receiving means 220 are coupled to an antenna 230 by a coupling means 240, which may be for example a circulator or a changeover switch. Coupled to the transmitter means 210 and receiving means 220 is a control means 250, which may be for example a processor. Transmission from the primary radio station 100 to the secondary station 200 takes place on a first channel 160 and transmission from the secondary radio station 200 to the primary station 100 takes place on a second channel 260.

Figure 2:
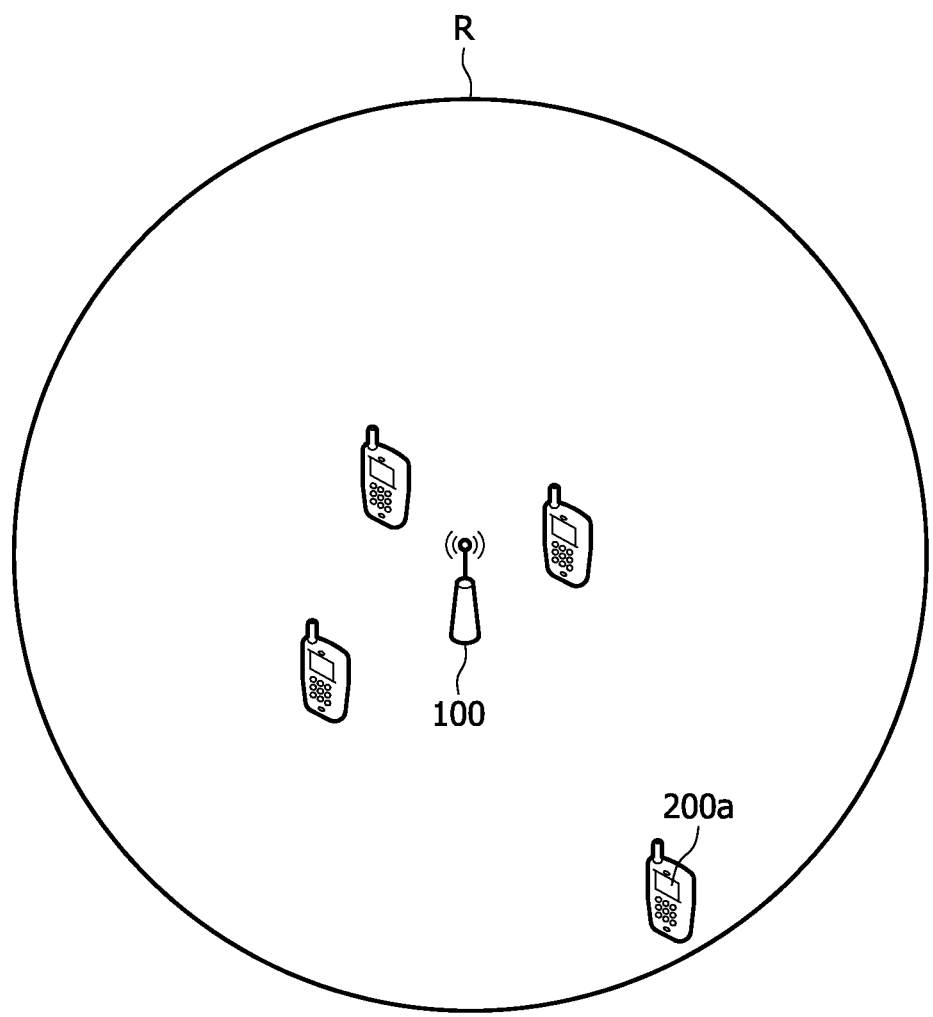
FIG. 2 is a diagram of the system of communication of FIG. 1.

As depicted on FIG. 2, when a secondary station 200a is located at the cell edge R, the required transmit power to transmit data to the base station 100 is so high that the uplink data rate has to be reduced. In order to send data, it is proposed to use a bundling approach where a packet is sent over a plurality of resource blocks over the time.

The present invention results from a recognition that new physical control channel signalling formats are needed which include the ability to change dynamically the number of resource blocks allocated to a secondary station, and in a specific embodiment the number of TTIs in a bundle, and which are adapted to a variety of packet sizes. The variation of the number of resource blocks allocated, for instance in a bundle, is adapted depending on at least one of several parameters such as the reachable data rate limited by the channel conditions or available transmission power, a channel quality information, or the priority of data to be sent.

In accordance with a variant of the invention, the number of resource blocks or of TTIs in a bundle depends on the size of the packets.

This permits the following:
Variable size packets can be supported by dynamically changing the number of TTIs in a bundle. (Without the ability to change dynamically the number of TTIs in a bundle, a data packet larger than the size assumed by the higher-layer signalling would have to be segmented into smaller packets, each of which would require their own control signalling message. This would result in a high control signalling overhead.)

It is possible for the system to adapt dynamically to changes in the data rate (as explained above referring to FIG. 2) that the transmission channel can support by changing the number of TTIs in a bundle Control channel signalling overhead can be reduced by reducing the number or size of control channel messages.

In one embodiment, a system for instance using LTE is provided, where the primary station from time to time transmits PDCCH messages in the downlink granting resources in the uplink. The PDCCH message includes one or more bits which indicate the number of TTIs in a bundle.

In a refinement of this embodiment the same PDCCH message size is used for bundled TTIs as for non-bundled TTIs. The bits used to indicate the number of TTIs in a bundle are stolen from the field used to indicate the resource allocation. Preferentially, the remaining bits are used to indicate resource allocations with small numbers of RBs rather than large numbers of RBs. The number of bits used to indicate the bundle size could be configured by higher layer signalling. As a special case, the interpretation of the bits in the PDCCH message, e.g. as indicating bundling or not, could depend on whether bundling is configured by higher layers.

Figure 3:
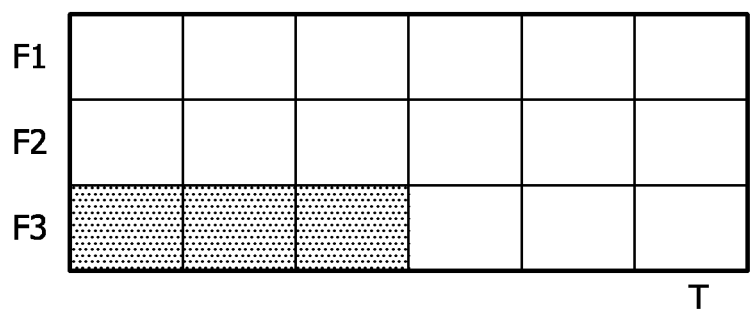
FIG. 3 is a representation of allocated resources in accordance with an embodiment of the invention.

In a further variation, when bundling is configured by higher layers, this could indicate that bundling (with a pre-determined bundling factor) should be applied to small RB allocations only (e.g. 1 RB). This is for instance depicted on FIG. 3, where only one subcarrier F3 is allocated to the secondary station but over three successive time frames, instead of only one in a normal allocation.

The indication of the number of TTIs in a bundle may comprise an indication of a difference from a default number of TTIs provided by other signalling, for example by broadcast signalling or higher-layer signalling. For instance, the secondary stations receive by higher layer signalling an indication of the number of TTIs usually used in bundle, for instance 2 TTIs, when using the bundling approach. Then, for each secondary station, a control signalling may be sent to indicate a difference with the default number of TTIs allocated. For instance, in the case illustrated in FIG. 3 where three TTIs are allocated, the considered secondary station has received with the allocation or in a separate message an indication that the number of TTIs really allocated is +1 compared with the default number of TTIs. This permits the number of bits used in the control signalling to be reduced and thus reduces the overhead.

In another embodiment in a system using LTE, the size of the resource allocation in the frequency domain is pre-determined (e.g. 1 RB) and the PDCCH message indicates the bundle size.

Figure 4:
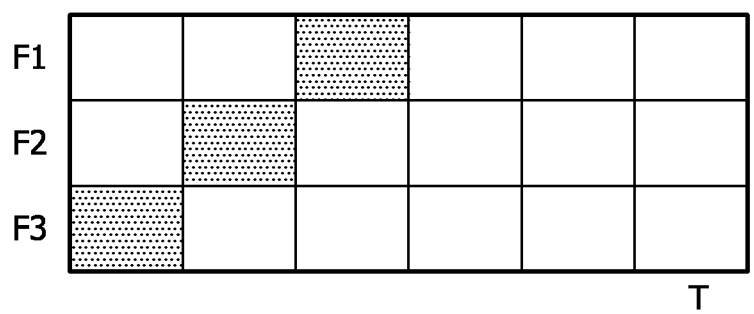
FIG. 4 is a representation of allocated resources in accordance with a variant of the embodiment of FIG. 3.

In another embodiment, the bits stolen from the field used to indicate frequency-domain resource allocation may be used to indicate a non-contiguous set of subframes in the time-domain which are to be treated as a bundle, in the same way that non-contiguous frequency-domain resources may be signalled. This may for example be used to indicate a periodic transmission pattern, which can increase time-diversity and improve reliability of reception of data packets, especially in cases when the transmission latency is not subject to tight constraints. As an example, FIG. 4 illustrates the allocation of a time bundle where the three allocated TTIs forming the bundle are spread over three different subcarriers F3, F2 and F1. This pattern may for example be predetermined, and in a variant of this embodiment, only the first subcarrier F3 is indicated to the secondary station which knows the predetermined pattern and may retrieve easily the two subsequent TTIs allocated in a bundle. In this example, there is no frequency offset between the allocated subcarriers, but to improve the frequency diversity a bigger offset may be specified.

In a refinement of this embodiment the size of the resource allocation in the frequency domain is indicated by higher layer signalling.

In a variation of this embodiment the PDCCH message size for the purpose of signalling a TTI bundle is the same size as a message size for some other purpose (e.g. for indicating paging messages). In this case the two different kinds of messages could be distinguished by a flag.

In the embodiments described previously, an acknowledgement or negative acknowledgement (ACK/NACK) of receipt of the data transmission could be sent following reception of the entire bundle, or as an alternative a separate ACK/NACK could be sent for each part of the bundle. Which of these alternatives is used may be configured by higher layer signalling, or depend on the size of the packet or the resource allocation (in any of the domains considered). In general it may be advantageous in terms of signalling overhead to send a single ACK/NACK for smaller resource allocations or packet sizes.

This invention may be used in communication systems utilising centralised scheduling, such as UMTS and LTE.

In this case, the secondary stations are mobile terminals for use in such systems, and the primary stations are base stations for such networks.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single unit may fulfill the functions of several items recited in the claims. The mere fact that certain measures are recited in mutually different dependent claims does not indicate that a combination of these measured cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A method for transmitting data from a secondary station to at least one primary station, comprising the acts of: transmitting by the at least one primary station on a signaling channel to the secondary station a resource allocation message allocating resource blocks for transmission of data from the secondary station; and transmitting the data from the secondary station to the at least one primary station using the allocated resource blocks, wherein the resource allocation message comprises a field for allocating resources in a first domain, wherein at least one bit of said field is stolen to allocate resources in a second domain being different from the first domain, wherein the first domain is a frequency domain and the second domain is a time domain, and wherein the at least one bit of said field indicates a non-contiguous set of frames in the time domain.

2. The method of claim 1, wherein a number of stolen bits allocating resources in the second domain is indicated by a further signaling channel.

3. The method of claim 2, wherein the further signaling channel is a higher layer signaling.

4. The method of claim 1, wherein a number of stolen bits is dependent on at least one of the size of the resource allocation and the packet size.

5. A method for transmitting data from a secondary station to at least one primary station, comprising the acts of: transmitting by the at least one primary station on a signaling channel to the secondary station a resource allocation message allocating resource blocks for transmission of data from the secondary station; and transmitting the data from the secondary station to the at least one primary station using the allocated resource blocks, wherein the resource allocation message comprises a field for allocating resources in a first domain, wherein at least one bit of said field is stolen to allocate resources in a second domain being different from the first domain, and wherein a number of stolen bits is zero for resource allocations smaller than a threshold, and greater than zero for resource allocations larger than a threshold.

6. The method of claim 5, wherein the threshold is either predetermined or signaled.

7. The method of claim 1, wherein the size of the resource allocation in the first domain is indicated by higher layer signalling.

8. The method of claim 1, wherein a number of stolen bits is equal to the number of bits in the field.

9. A primary station comprising: a transmitter configured to transmit data to a secondary station; and a receiver configured to receive data from the secondary station, wherein the transmitter is further configured to transmit on a signaling channel to the secondary station a resource allocation message allocating resource blocks for transmission of data from the secondary station, said message comprising a field for allocating resources in a frequency domain, wherein at least one bit of said field is stolen to indicate a non-contiguous set of frames in a time domain.

10. A primary station comprising: a transmitter configured to transmit data to a secondary station; and a receiver configured to receive data from the secondary station, wherein the transmitter is further configured to transmit on a signaling channel to the secondary station a resource allocation message allocating resource blocks for transmission of data from the secondary station, wherein the resource allocation message comprises a field for allocating resources in a first domain, wherein at least one bit of said field is stolen to allocate resources in a second domain being different from the first domain, and wherein a number of stolen bits is zero for resource allocations smaller than a threshold, and greater than zero for resource allocations larger than a threshold.

* * * * *